US006190508B1

(12) United States Patent
Peng et al.

(10) Patent No.: US 6,190,508 B1
(45) Date of Patent: Feb. 20, 2001

(54) METHOD OF OXIDIZING NITRIDE MATERIAL ENHANCED BY ILLUMINATION WITH UV LIGHT AT ROOM TEMPERATURE

(75) Inventors: Lung-Han Peng; Yi-Chien Hsu, both of Taipei; Chin-Yuan Chen, Hsinchu; Jin-Kuo Ho, Taipei; Chao-Nien Huang, Kaohsiung, all of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/287,326

(22) Filed: Apr. 7, 1999

(30) Foreign Application Priority Data

Apr. 7, 1998 (TW) .................................. 87105214

(51) Int. Cl.[7] ............................ C01B 21/00; C01B 13/00
(52) U.S. Cl. ................... 204/157.46; 204/157.41; 204/157.5
(58) Field of Search ................ 204/157.46, 157.5, 204/157.4, 157.41

(56) References Cited

U.S. PATENT DOCUMENTS

| 5,787,104 | * | 7/1998 | Kamiyama et al. | ............. | 372/43 |
| 5,895,223 | * | 4/1999 | Peng et al. | ............. | 438/18 |

FOREIGN PATENT DOCUMENTS

| 08203862A | * | 8/1996 | (JP) . |
| 11229199A | * | 8/1999 | (JP) . |

OTHER PUBLICATIONS

Logan, R.A. et al., "The Anodic Oxidation of GaAs in Aqueous $H_2O_2$ Solution," *J. Electrochem. Soc.*, 120:1385–1390 (1973) no month available.

Vartuli, C.B., et al., "High temperature surface degradation of III–V nitrides," *J. Vac. Sci. Technol.*, B 14(6):3523–3531 (1996) no month available.

Wolter, S.D., et al.,"X–ray photoelectron spectroscopy and x–ray diffraction study of the thermal oxide on gallium nitride," *Appl. Phys. Lett.*, 70(16):2156–2158 (1997) no month available.

* cited by examiner

Primary Examiner—Kathryn Gorgos
Assistant Examiner—Thao Tran

(57) ABSTRACT

A method of forming oxide from nitride, in which the oxidation is enhanced by illuminating the nitride material with UV light. This method produces a rapid growth of oxide and allows for the monitoring of the oxide thickness in situ. The method comprises the steps of (i) placing the nitride material on an illuminating holder; (ii) dipping the nitride material and the illuminating holder in an electrolyte; and (iii) illuminating the nitride material with a light having an energy larger than the energy gap of the nitride material. The nitride material can be connected to a conductive electrode located in the electrolyte via a galvanometer to monitor a photo current generated by the oxidation of the nitride material so as to monitor the thickness of the oxide formed on the nitride material in situ. A metal coating can be coated on the nitride material to define the oxide forming region. The pH value of the electrolyte is in a range of approximately 3 to 10, and is preferably about 3.5.

11 Claims, 6 Drawing Sheets

METHOD OF OXIDIZING NITRIDE MATERIAL ENHANCED BY ILLUMINATION WITH UV LIGHT AT ROOM TEMPERATURE

BACKGROUND OF THE INVENTION

1. Field of the Invention

This invention relates to a method of forming oxide from nitride, more particularly to a process for wet oxidizing nitride enhanced by illumination with UV light.

2. Description of Prior Art

IC components are normally made of silicon. However, components made of silicon usually malfunction when operated at a high-temperature. In order to address this issue, it is desirable to fabricate IC components using III–V semiconductor materials since such components operate normally in a large temperature range. Furthermore, III–V semiconductor materials can be used to fabricate light-emitting devices. Recently, research into light-emitting devices has been focused on devices emitting light having a shorter wavelength, such as yellow, green or blue light. One of the most important materials used in the fabrication of such light-emitting devices is GaN.

The oxidation of single crystal gallium nitride has been investigated because of its importance in many electronic and optoelectronic applications, especially in achieving desired performances of III–V or II–VI semiconductor optoelectronic devices. For example, gallium oxide can serve as a growth template of a laser diode and form surface passivation, isolation, and AR coatings in semiconductor devices. The use of gallium oxide in the above applications can lead to a significant improvement.

Referring to FIG. 1, which indicates the increase of photo-response on the oxidized GaN due to the combination effects of surface passivation and index matching, in which curve A represents the photo-current response of $Ga_2O_3$ and curve B represents the photo-current response of GaN. Furthermore, referring to FIG. 2, the data reveals the enhancement of PL intensity on the oxidized GaN region due to the index matching and surface passivation, wherein curve A' indicates $Ga_2O_3$/GaN and curve B' indicates GaN.

It is well known to those skilled in the art that a major shortcoming of GaAs-based semiconductor materials is the relatively poor quality and/or instability of the semiconductor/insulator interfaces typically produced by prior art methods. In the prior art, a conventional thermal oxidation technique is normally used to form oxide on GaN material. For example, "X-ray photoelectron spectroscopy and x-ray diffraction study of the thermal oxide on GaN", Appl. Phys. Lett. 70, p. 2156–2158 (1997), by S. D. Wolter, et al, discloses the production of $Ga_2O_3$ when GaN is reacted with hot dry air. In this prior art, the oxidation starts gradually at 900° C. and the growth rate of $Ga_2O_3$ is only about 20 nm/hr. However, "High temperature surface degradation of III–V nitrides," J. Vac. Sci. Technol. B 14, p. 3523–3531 (1996), C. B. Vartuli et al. indicates that the thermal process results in the evaporation of the nitrogen atoms of the mixed material InAlN/InGaN serving as the active region of the light-emitting device. For the mixed material InAlN/InGaN, gallium coagulates in the form of droplets when nitrogen evaporates at around 800° C. and 900° C., causing the degradation of the optical characteristics and surface flatness of the device.

"The anodic oxidation of GaAs in aqueous $H_2O_2$ solution," J. Electrochem. Soc. 120, p. 1358–1390 (1973), A. Logan et al., discloses another growing technique of gallium oxide in which an anode electrolysis process is used by applying a bias voltage to GaAs dipped in electrolyte, thus forming gallium oxide by the effect of bias current. However, the thickness of the oxide formed by this method is limited. An applied voltage of about 100~200 volts is required to achieve an oxide thickness of about 2000 Å since the bias voltage has to be increased proportionate to the thickness of the oxide. In other words, the electric field required to be applied to the interface of oxide and semiconductor is nearly 106~107 volts/cm, which is over the breakdown voltage of about 105 volts/cm for normal semiconductor material. Hence, the quality of the oxide formed is not reliable. Therefore, the method of oxidizing nitride by applying a bias voltage is not feasible to the fabrication of optoelectronic or electronic devices.

SUMMARY OF THE INVENTION

In order to address the above problems, this invention provides a method of oxidizing nitride using a 254-nm UV light to enhance the wet oxidation of InAlN/InGaN.

One aspect of this invention is that o bias is needed to grow the oxide; therefore, the thickness and quality of the oxide is not limited by the bias voltage.

Another aspect of this invention is that the thickness of the oxide can be monitored in-situ.

This invention utilizes a 254-nm UV light to illuminate the surface of a nitride material during oxidation so that hot hole-electron pairs are produced. The holes are involved with the oxidation of the nitride, and the electrons form a conductive loop via the metal conductor and the electrolyte. This invention allows the rapid formation of gallium oxide at room temperature, and it is possible to monitor the thickness of the oxide in-situ by means of measuring the loop current. This invention further provides the advantages of easy utilization, low maintenance cost and high reliability when applied to mass production.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
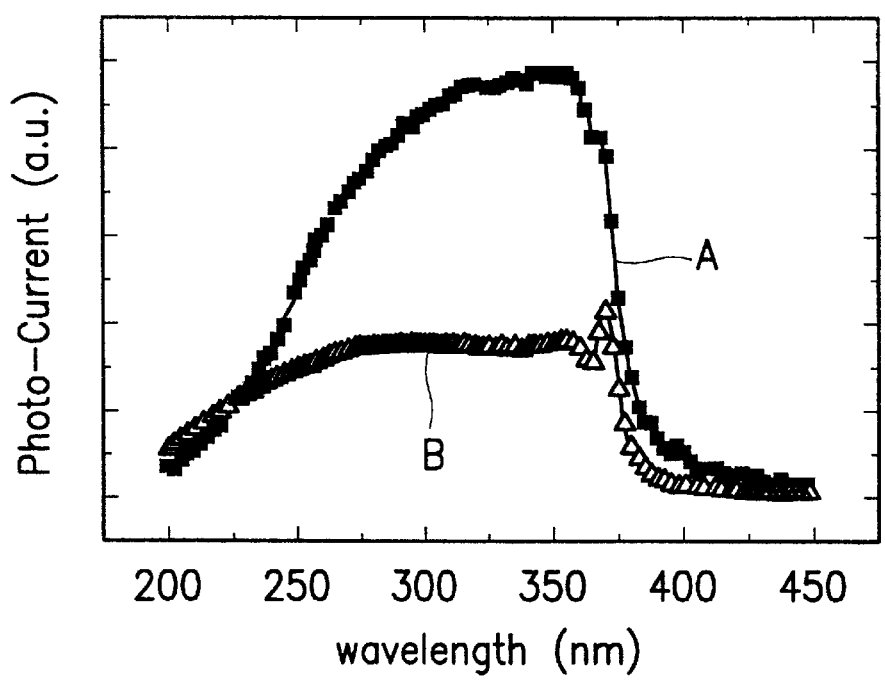
FIG. 1 illustrates the photo-current response of $Ga_2O_3$/GaN.
Figure 2:
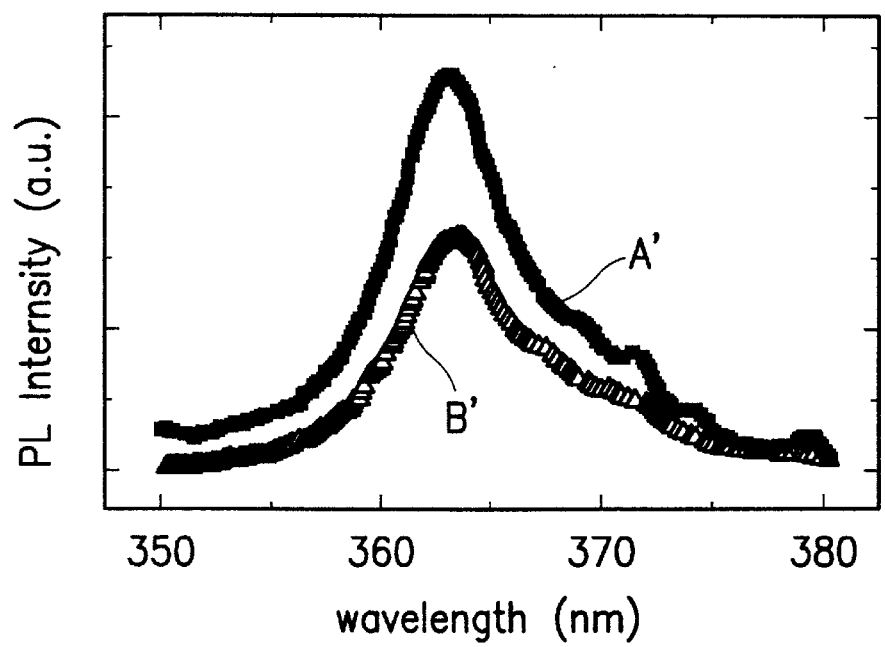
FIG. 2 illustrates the PL data of $Ga_2O_3$/GaN and GaN.
Figure 3:
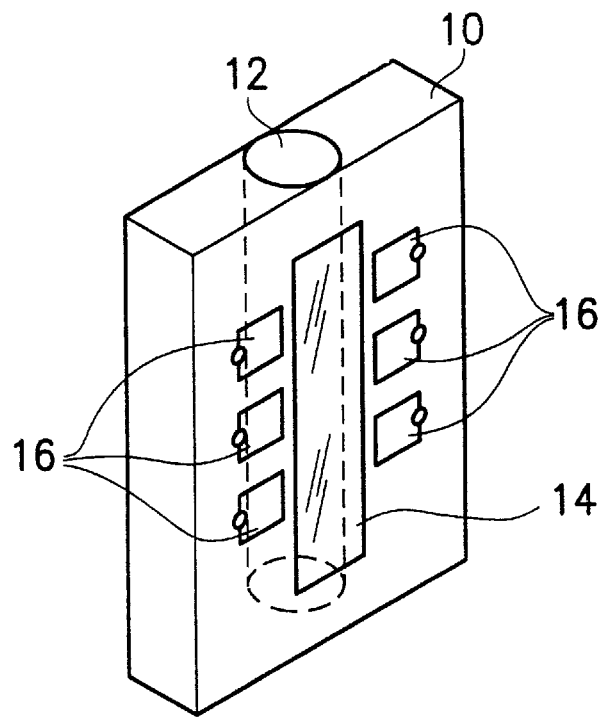
FIG. 3 is an exploded view of an illuminating holder used in this invention.

In this invention, an illuminating holder is used to fixedly hold and illuminate nitride material with UV light during the oxidation of said material. An illuminating holder as shown in FIG. 3 is therefore provided, which includes an insulating substrate 10 in which a quartz tube 12 is formed to receive a light source, a groove 14 formed on the insulating substrate to output the light emitted by the light source therethrough, and a plurality of clips 16 symmetrically formed on both sides of the transparent groove 14 to hold the nitride material.

The insulating substrate 10 can be made of Teflon to prevent corrosion during the oxidizing process.

The wavelength (or frequency) of the light must satisfy the following equation in order to excite the electrons in the nitride material from the valence band to the conductive band so as to produce hot free electrons and, consequently, form a closed loop in the electrobath:

$$hv > Eg$$

where hv represents the energy of the light, h is the Planck constant, v is the frequency of the light, and Eg is the energy gap between the conductive band and the valence band of the nitride material.

Figure 4:
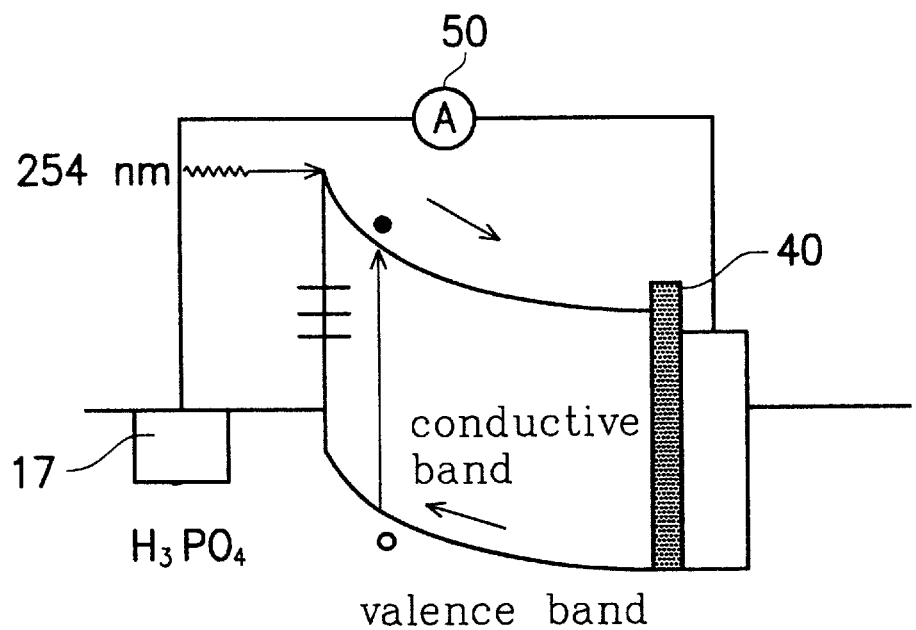
FIG. 4 is a diagram illustrating the energy level of the structure formed by using the oxidation method of this invention.

Referring to FIG. 4, hot hole-electron pairs are produced when UV light illuminates a nitride material such as GaN. The holes take part in the dynamic chemical reaction of GaN and the electrolyte, i.e., the oxidation of GaN to $Ga_2O_3$. The electrons take part in the reduction of $H^+$ in the electrolyte.

Figure 5:
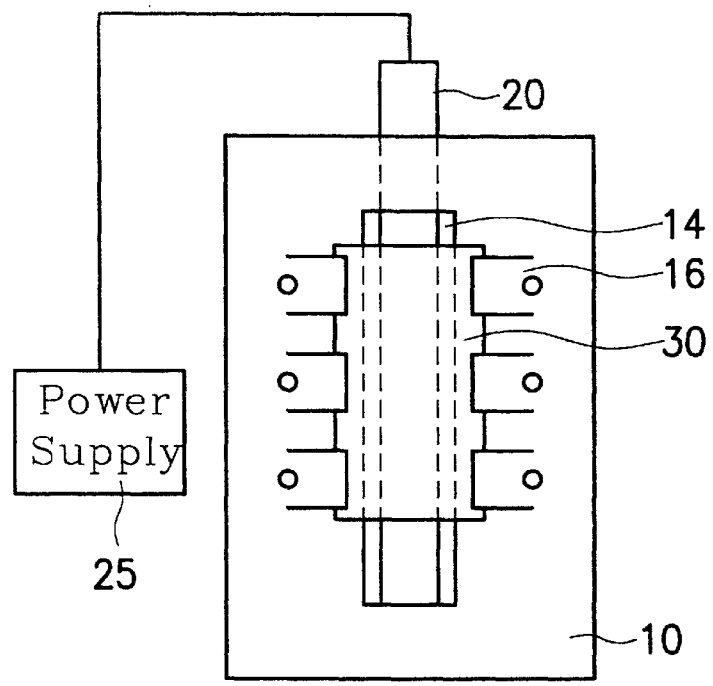
FIG. 5 is a front view of the holder providing the light source for illuminating the nitride material according to this invention.

Referring to FIG. 5, a halogen lamp 20 emitting a 254-nm UV light is disposed in the quartz tube 12 of the illuminating holder. Nitride material 30, such as GaN, AlInGaN and so on, is fixed on the substrate 10 by means of the plurality of clips 16. One side of the nitride material 30 faces the transparent groove 14 so that the UV light can illuminates the nitride material 30 through the transparent groove 14. In addition, the power supply 25 is used to provide electricity to the halogen lamp 20.

Figure 6:
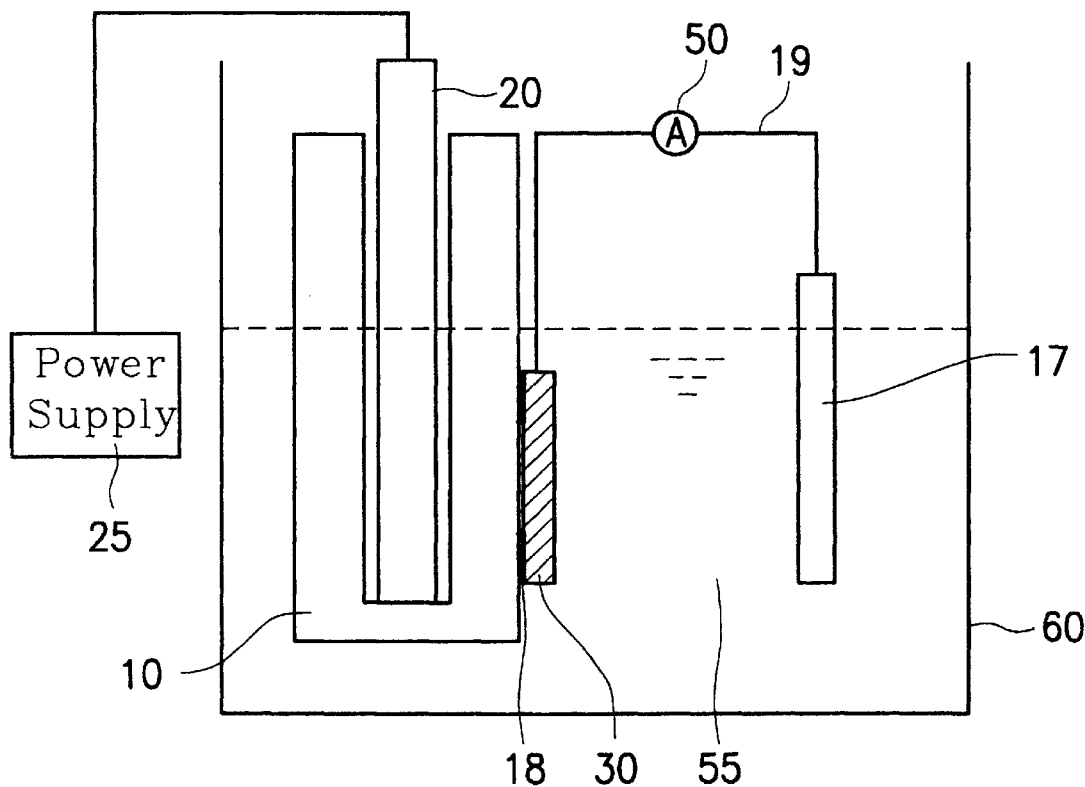
FIG. 6 is a diagram illustrating the structure of the device carrying out the oxidation method of this invention.

Referring to FIG. 6, the device for oxidizing nitride material according to this invention includes an electrobath 60 containing an electrolyte 55, the illuminating holder as shown in FIG. 5, a conductive electrode 17 partially dipped in the electrolyte, and a galvanometer 50 electrically connecting the platinum electrode 17 to the nitride material 30 through a conductive line 19. The illuminating holder has a halogen lamp 20 disposed therein and is partially dipped in the electrolyte. The nitride material fixedly held on the illuminating holder is completely dipped in the electrolyte. The conductive electrode 17 could be formed with platinum. A metal coating 18 can be coated on the nitride material 30 to define the oxide forming region.

Referring again to the illustration of FIG. 6, the method of oxidizing nitride material of this invention includes the steps of: (i) placing nitride material 30 on the illuminating holder 10; (ii) dipping the nitride material 30 and the illuminating holder 10 in the electrolyte 55; and (iii) illuminating the nitride material 30 with a 254-nm UV light emitted by the halogen lamp 20. A loop current is monitored by the galvanometer 50 to control the oxide thickness of the nitride material 30 in situ. The loop current is formed by the electrons flowing in a loop comprising the nitride material 30, the electrolyte 55, the electrode 17, the galvanometer 50 and the conductive line 19 when the reaction occurs.

In the above embodiment, the power of the halogen lamp is only about 10 $mW/cm^2$.

In a second embodiment, the electrobath can be made of a material which does not absorb UV light, for example quartz, such that the activation effect and the absorption effect of the electrolyte due to the UV light can be ignored. Thus, the halogen lamp can be positioned on the outside of electrobath. Furthermore, in this embodiment, the illuminating holder can be reduced to a simplified structure securing the nitride material. The illuminating material can either pass or not pass the UV light. In other words, tae quartz tube disposed in the substrate as in the first embodiment is not necessary.

The light source used in this invention is not limited to a halogen lamp. Any device which can emit a light having an energy (hv) larger than the energy gap of the nitride material can be used to achieve the object of this invention. For example, the light source can be a 308-nm XeCl excimer laser, a 248-nm KrF excimer laser, a 193-nm ArF excimer laser, a 157-nm F excimer laser, a $N_2$ molecular laser, He-Cd molecular laser, a quarter-wavelength YAG laser, a deuterium lamp or a xenon lamp, and so on. The pH value of the electrolyte used in the above embodiments is in a range of approximately 3 to 10, and is preferably around 3.5. When the nitride material is GaN, the electrolyte can be KOH, $H_2O_2$, $H_2SO_4$ or $H_3PO_4$.

Furthermore, the metal coating 18 coated on the nitride material must have a work function larger than the electronic affinity of the nitride material. The metal coating 18 can be dual-layer to increase the speed of oxidation. However, the work function of the outer layer of the dual-layer metal coating must be larger than that of the inner layer. For example, the inner layer of the dual-layer metal coating can be titanium(Ti), vanadium(V), chromium(Cr), zirconium (Zr), molybdenum(Mo), hafnium(Hf), tantalum(Ta), wolfram(W) or a composition thereof. The outer layer of the dual-layer metal can be rhenium(Fe), platinum(Pt), ruthenium(Ru), rhodium(Rh) palladium(Pd), gold(Au), iridium(Ir), nickel(Ni) or a composition thereof.

Figure 7:
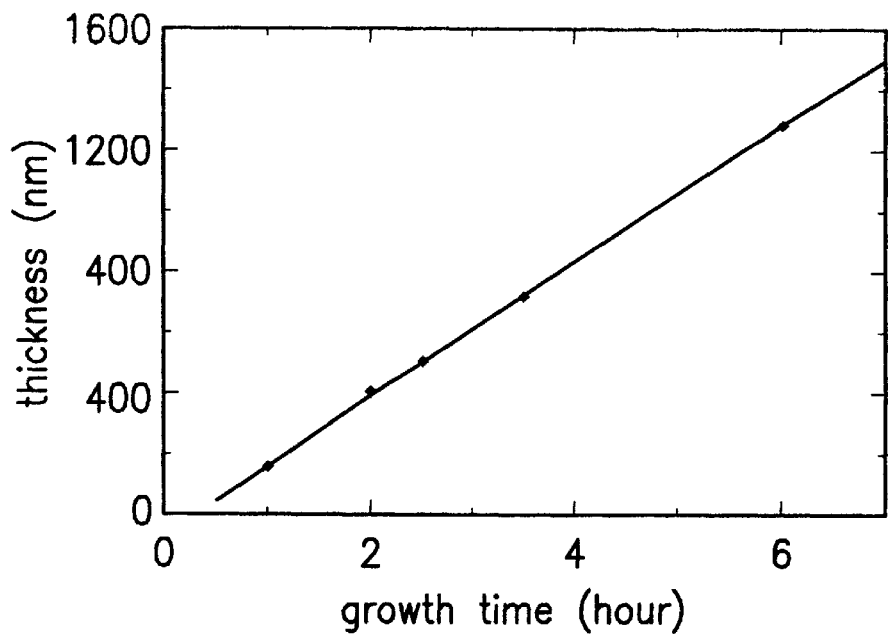
FIG. 7 illustrates the growth rate of the $Ga_2O_3$ according to the method of this invention.

Compared with the prior art, the method of oxidizing nitride material according to this invention can provide a fast oxidation process for nitride material without applying a bias to the nitride material or placing the nitride material in a high-temperature environment. The oxidation GaN in this invention can achieve a speed of 0.2 μm/hr. Referring to FIG. 7, which illustrates the growth rate of the $Ga_2O_3$ according to the method of this invention. It is found that the growth rate is about 220 nm/hr in this drawing.

Figure 8:
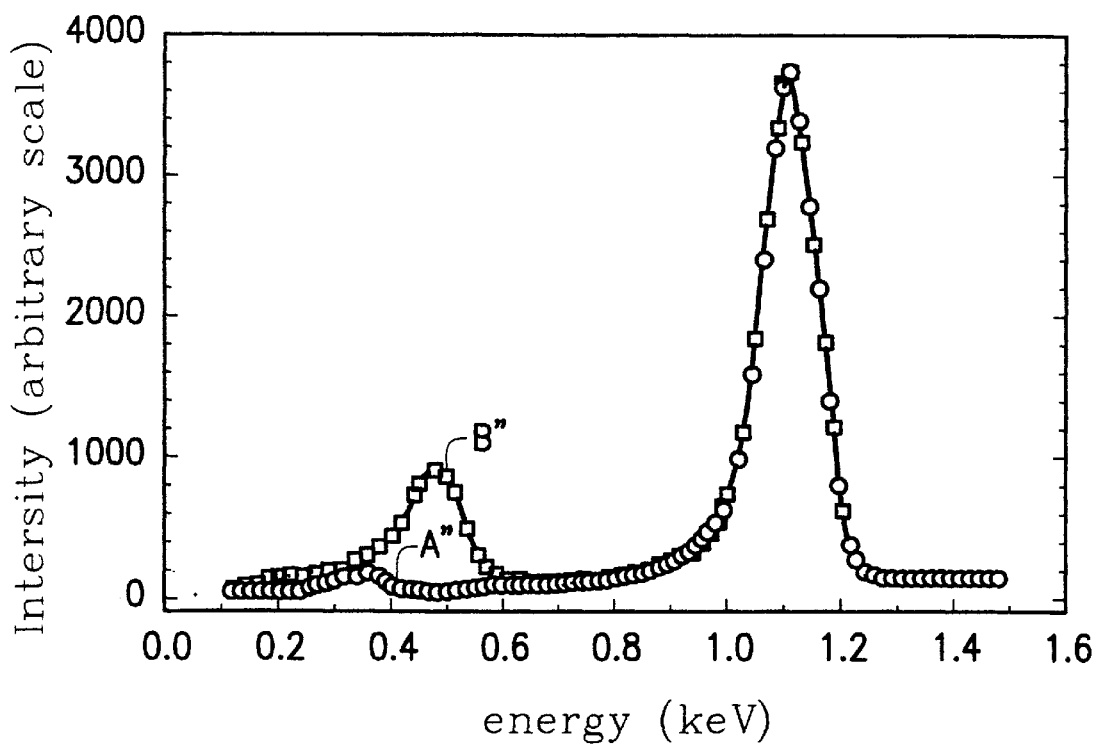
FIG. 8 is a curve illustrating the EDX test for the GaN material before and after illumination by UV light, respectively.

FIG. 8 illustrates the difference between oxidizing GaN without illumination by a UV light source (indicated by curve A") and with illumination by a UV light source (indicated by curve B"). This drawing shows the results of EDX (energy dispersion X-ray) testing for GaN, wherein the longitudinal axis represents the bonding energy and the transversal axis represents the intensity. In the case in which there is no illumination with UV light, there are two peaks at about 0.35 KeV and 1.3 KeV, respectively. This implies that only nitrogen and gallium are found in the material. However, in the case in which there is illumination with UV light, there is a further peak at about 0.5 KeV, which has an intensity far larger than that of the peak indicating nitrogen. This means that most of the gallium nitride was oxidized to gallium oxide.

Figure 9A:
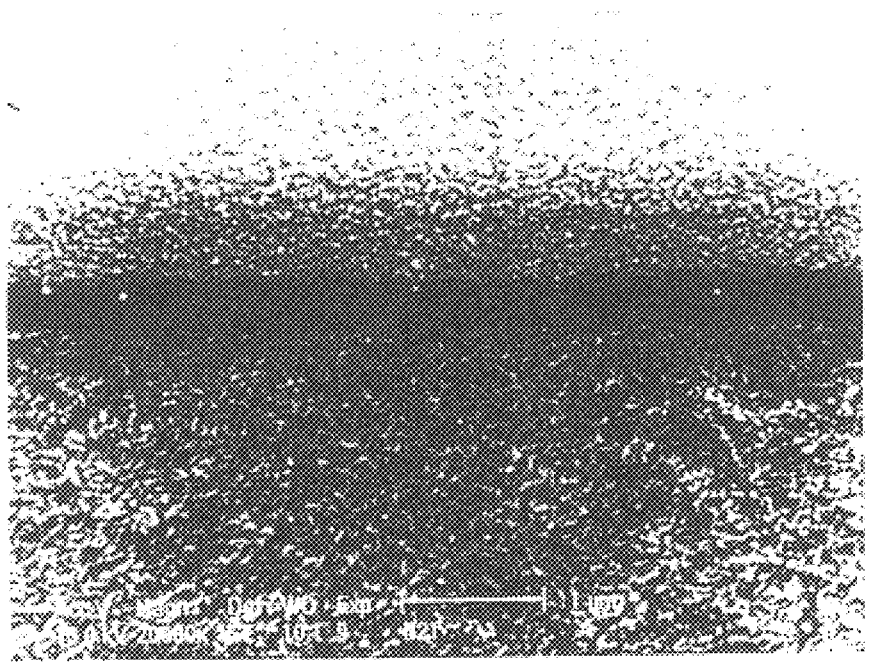
FIG. 9a is a SEM micrograph of 100 nm thick $Ga_2O_3$ thin film fabricated according to this invention.
Figure 9B:
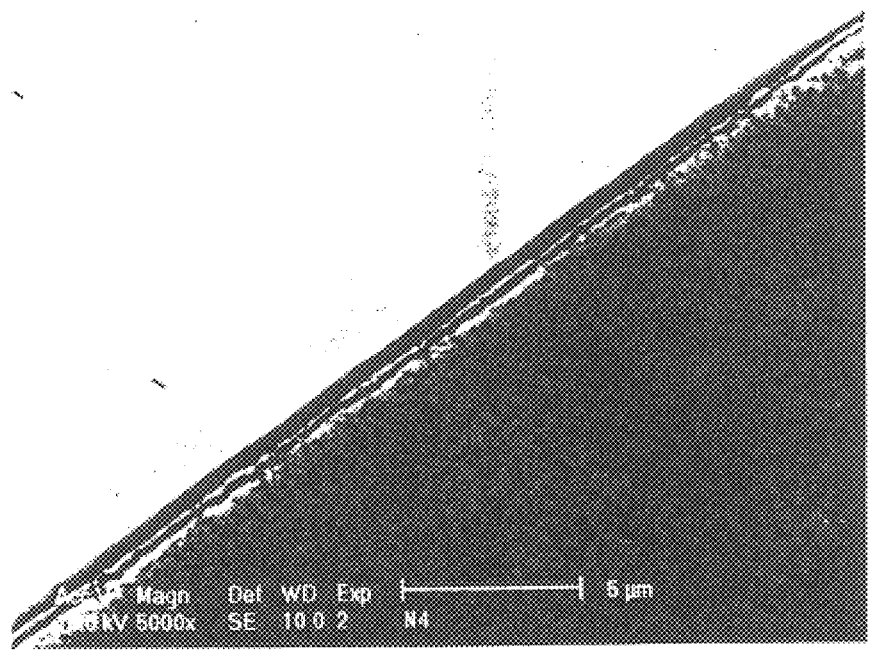
FIG. 9b is a SEM micrograph of 470 nm thick $Ga_2O_3$ thin film fabricated according to this invention.

The method of oxidizing gallium nitride according to this invention can form gallium oxide with a good quality. Referring to the drawings, FIG. 9a is a SEM micrograph of 100 nm thick $Ga_2O_3$ thin film, and FIG. 9b is a SEM micrograph of 470 nm thick $Ga_2O_3$ thin film, in which the lower portion in FIGS. 9a and 9b is oxide.

Figure 10:
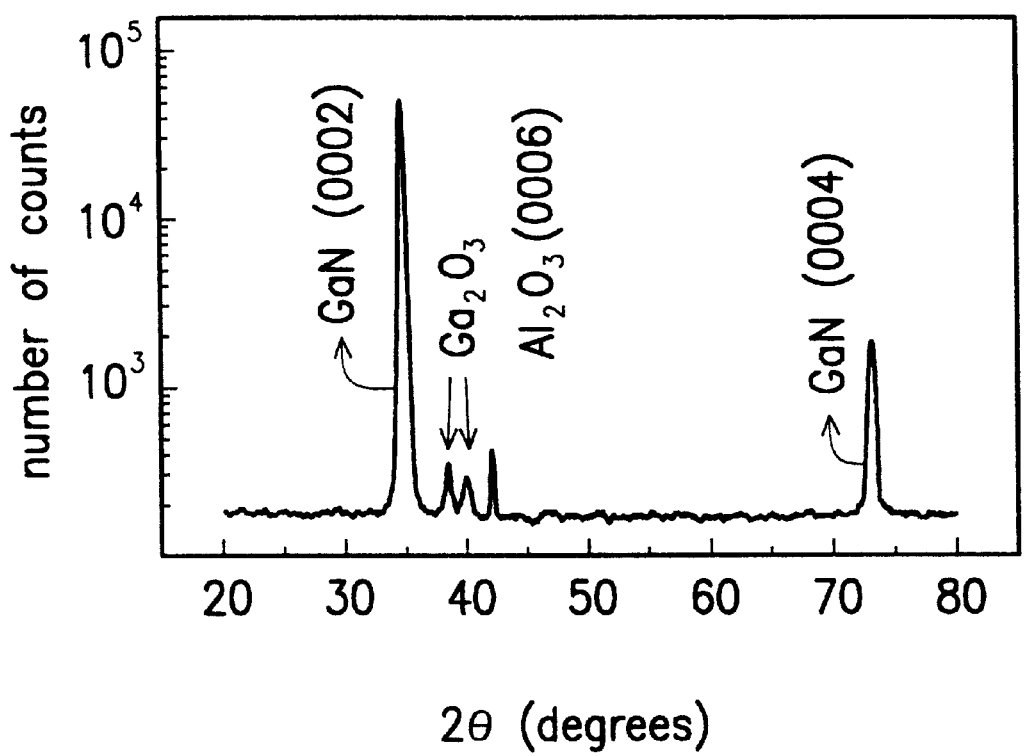
FIG. 10, which illustrates the XRD data of $Ga_2O_3$ thin film fabricated according to this invention.

Furthermore, the oxide can be characterized by x-ray diffraction (XRD) to determine its crystallographic form. Referring to FIG. 10, which illustrates the XRD data of $Ga_2O_3$ thin film.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of oxidizing a nitride material at room temperature comprising the steps of:

(i) placing the nitride material on an illuminating holder;

(ii) dipping the nitride material and the illuminating holder in an electrolyte having a pH value approximately ranged from 3 to 10; and (iii) illuminating the nitride material with a light having an energy larger than the energy gap of the nitride material.

2. A method of oxidizing a nitride material as claimed in claim 1 further comprising a step of coating a metal coating on the nitride material to define a region of forming oxide prior to step (i).

3. A method of oxidizing a nitride material as claimed in claim 1 further comprising a step of connecting the nitride material to a conductive electrode located in the electrolyte via a galvanometer after step (iii) to monitor a photo current generated by oxidation of the nitride material so as to monitor a thickness of the oxide formed on the nitride material in situ.

4. A method of oxidizing a nitride material as claimed in claim 1 wherein the nitride material is gallium nitride.

5. A method of oxidizing a nitride material as claimed in claim 1 wherein the light illuminating the nitride material is UV light.

6. A method of oxidizing a nitride material as claimed in claim 2 wherein the metal coating is dual-layer including an inner layer and an outer layer, in which a work function of the outer layer is larger than that of the inner layer.

7. A method of oxidizing a nitride material as claimed in claim 1 wherein the electrolyte is one of $KOH$, $H_2O_2$, $H_2SO_4$ or $H_3PO_4$.

8. A method of oxidizing a nitride material as claimed in claim 1 wherein the pH value is around 3.5.

9. A method of oxidizing a nitride material as claimed in claim 5 wherein the light source is one of a 308-nm XeCl excimer laser, a 248-nm KrF excimer laser, a 193-nm ArF excimer laser, a 157-nm $F_2$ excimer laser, a $N_2$ molecular laser, He—Cd molecular laser, a quarter-wavelength YAG laser, a deuterium lamp or a xenon lamp.

10. A method of oxidizing a nitride material as claimed in claim 6 wherein the outer layer of the dual-layer metal coating is one of Re, Pt, Ru, Rh, Pd, Au, Ir, Ni or a composition thereof.

11. A method of oxidizing a nitride material as claimed in claim 6 wherein the inner layer of dual-layer metal coating is one of Ti, V, Cr, Zr, Mo, Hf, Ta, W or a composition thereof.

* * * * *